United States Patent
Nakamura et al.

(10) Patent No.: US 9,899,646 B2
(45) Date of Patent: Feb. 20, 2018

(54) BATTERY MODULE HAVING BATTERY GUIDING PORTIONS

(71) Applicant: TOYODA GOSEI CO., LTD., Kiyosu-shi, Aichi-ken (JP)

(72) Inventors: Yoshiki Nakamura, Kiyosu (JP); Kosuke Kusaba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 280 days.

(21) Appl. No.: 14/819,574

(22) Filed: Aug. 6, 2015

(65) Prior Publication Data

US 2016/0093853 A1  Mar. 31, 2016

(30) Foreign Application Priority Data

Sep. 30, 2014 (JP) ................................ 2014-199743

(51) Int. Cl.
  *H01M 6/42* (2006.01)
  *H01M 2/10* (2006.01)
(52) U.S. Cl.
  CPC ...... *H01M 2/1077* (2013.01); *H01M 2220/20* (2013.01)
(58) Field of Classification Search
  CPC ............. H01M 2/1077; H01M 2/1072; H01M 2/1016; H01M 2/105; H01M 2/10; H01M 2/20; H01M 2/202; H01M 2/22
  See application file for complete search history.

(56) References Cited

U.S. PATENT DOCUMENTS

| 8,748,025 B2 | 6/2014 | Ohta |
| 9,543,554 B2 | 1/2017 | Takeda et al. |
| 2014/0287288 A1 | 9/2014 | Takeda et al. |

FOREIGN PATENT DOCUMENTS

| CN | 201285779 Y | 8/2009 | |
| CN | 104064702 A | 9/2014 | |
| JP | 2009-272160 | * 11/2009 | ............. H01M 2/10 |
| JP | 2009-272160 A | 11/2009 | |
| JP | 2014-002850 A | 1/2014 | |

OTHER PUBLICATIONS

Office Action dated Jul. 4, 2017 in the corresponding Chinese Patent Application No. 201510535486.3 (and English translation).

* cited by examiner

*Primary Examiner* — Raymond Alejandro
(74) *Attorney, Agent, or Firm* — Posz Law Group, PLC

(57) ABSTRACT

A battery module includes a battery group configured of a plurality of cylindrical batteries, a holder configured to retain the battery group so that the respective batteries are bundled in parallel to each other, and a casing being closed by the holder and including a storing space for housing the battery group. The casing includes an opposing wall portion facing the holder, and the opposing wall portion includes hole portions that retain the batteries by peripheries or inner circumferential surfaces of the hole portions. The battery module also includes guiding portions formed on the peripheries or the inner circumferential surfaces of the hole portions that are configured to guide the batteries into the storing space within the casing by causing the batteries to come closer to centers of the hole portions, such that central axis lines of the batteries pass through the centers of the hole portions.

5 Claims, 8 Drawing Sheets

BATTERY MODULE HAVING BATTERY GUIDING PORTIONS

TECHNICAL FIELD

The present invention relates to a battery module.

BACKGROUND ART

Electric vehicles that run on driving power of electric motors and hybrid vehicles that run on the driving power of both internal combustion engines and electric motors are each mounted with a battery module, as its power source device, in which a large number of batteries are provided. A battery module is housed in a casing in a state of retaining a plurality of batteries by a holder. A space through which air can flow is formed inside of the casing so as to cool the batteries. The batteries are arranged vertically in the space inside the casing in a state where they are fitted into retaining holes formed in the holder. Intervals between the respective batteries are retained to be constant, and the respective batteries are cooled by circulating the air in the intervals.

To produce the battery module at low cost, there is a desire to place the plurality of batteries simultaneously in the space in the casing and position them. However, when a plurality of batteries is inserted into the space in the casing at one time, the respective batteries may be inserted into the casing with being tilted, and variations may be generated in positions of the batteries and postures of the batteries after the insertion, by the postures of the batteries after the insertion becomes tilted for example.

Further, as a method for positioning batteries to a casing, for example, as disclosed in JP 2014-2850 A and JP 2009-272160 A, there is a method for positioning the batteries by forming tapered portions on inner circumferential surfaces of retaining holes that retain the batteries in the holder.

CITATION LIST

Patent Literature

Patent Literature 1: JP 2014-2850 A
Patent Literature 2: JP 2009-272160 A

SUMMARY OF INVENTION

Technical Problem

However, in battery modules disclosed in JP 2014-2850 A and JP 2009-272160 A, a structure of the holder becomes complicated, and production cost of the battery modules becomes high.

The present invention has been made in view of the above circumstance, and aims to provide a battery module that can position batteries with a simple configuration.

Solution to Problem (1) A battery module of the present invention comprises a battery group configured of a plurality of cylindrical batteries; a holder configured to retain the battery group so that the respective batteries are bundled in parallel to each other; and a casing being closed by the holder and including a storing space for housing the battery group, in that the casing includes an opposing wall portion facing the holder, the opposing wall portion includes hole portions that retain the batteries by peripheries or inner circumferential surfaces of the hole portions, and guiding portions formed on the peripheries or the inner circumferential surfaces of the hole portions and configured to guide the batteries by causing the batteries to come closer to centers of the hole portions, such that central axis lines of the batteries pass through the centers of the hole portions, upon when the batteries are inserted into the storing space.

The guiding portions that guide the batteries by causing the batteries to come closer to the centers of the hole portions, such that central axis lines of the batteries pass through the centers of the hole portions, upon when the batteries are inserted into the storing space, are formed on the peripheries or the inner circumferential surfaces of the hole portions on the opposing wall portion of the casing. Due to this, when the batteries are inserted into the casing, the batteries are guided by the guiding portions and are accurately positioned relative to the casing. Further, even when a plurality of batteries is simultaneously put into the casing, the plurality of batteries can accurately be positioned relative to the casing simultaneously. Even in cases where variations are generated in the inserting direction by the batteries being tilted upon the battery insertion, the batteries can be guided by the guiding portions and accurately be positioned in the casing.

(2) The guiding portions preferably are tapered surfaces inclined radially inward toward an inserting direction of the batteries. When the batteries are put into the casing, the ends of the batteries on the insertion direction side abut the tapered surfaces, and the batteries are thereby guided toward the centers of the hole portions.

(3) The guiding portions are preferably surfaces of protrusions that protrude toward the storing space from the peripheries of the hole portions on the opposing wall portion. When the batteries are put into the casing, the ends of the batteries on the insertion direction side abut the guiding portions formed on the protrusions, and the batteries are thereby guided toward the centers of the hole portions. As the protrusions, for example, there may be projecting portions formed in a circumferential direction on the peripheries of the hole portions, or protruding portions protruding on the peripheries of the hole portions.

(4) Preferably, the holder includes a plurality of retaining holes, each including an inner circumferential surface along which a corresponding battery is inserted and which retains a peripheral surface of the corresponding battery, the centers of the hole portions of the casing are positioned on central axis lines of the retaining holes, and in each of the guiding portions, an outermost portion of the guiding portion is positioned on an outer side than a position that is separated by $D \cdot H/L$ on a radially outer side of the corresponding hole portion from a position of a straight line extending in a central axis line direction of the retaining holes and passing through an inner opening end of the corresponding retaining hole, where a difference between an opening diameter of the retaining hole and a diameter of the battery is denoted H, a length of the retaining hole in the central axis line direction is denoted L, and a distance between a virtual perpendicular line that is drawn from the inner opening end of the retaining hole to a central axis line of the retaining hole and a virtual perpendicular line that is drawn from the outermost portion of the guiding portion, which is a portion that is farthest away from the hole portion, toward the central axis line of the retaining hole is denoted D.

When the centers of the hole portions are positioned on the central axis lines of the retaining holes, the hole portions are positioned immediately above the retaining holes. In this case, when the batteries are inserted into the storing space of the casing, in a case where the batteries are to be inserted with the largest tilt, each of the batteries is engaged with the outer opening end and inner opening end of the corresponding retaining hole, at opposite sides from one another in a radial direction of the retaining hole with the center of the retaining hole in between. The batteries are inserted into the storing space in this state, and when the ends of the batteries in the inserting direction side have reached a height of the outermost portion of the guiding portions, the ends of the batteries in the inserting direction side are at the positions that are apart from the position on the straight line extending in the direction of the central axis line of the retaining holes from the inner opening ends of the retaining holes, by a distance, which is D·H/L (D×H/L), on the radially outer side of the hole portions. With the outermost portion of the guiding portion being positioned on the outer side of this position, when the batteries are tilted and inserted into the storing space, the end of each battery surely makes contact with the corresponding guiding portion and is guided so that the battery is located in the center of the corresponding hole portion.

(5) Preferably, receiving surfaces for engaging ends of the batteries on a radially inner side than the guiding portions are provided on peripheries or inner circumferential surfaces of the hole portions. The ends of the batteries are stably retained by the receiving surfaces.

(6) Preferably, a bottom of the storing space of the casing is configured of the opposing wall portion. By inserting the batteries in the retaining holes of the holder and further inserting the batteries into the storing space of the casing, the batteries make contact with the guiding portions on the peripheries of the hole portions formed on the opposing wall portion of the casing, and the batteries are guided toward the centers of the hole portions by the guiding portions.

Advantageous Effects of Invention

Since the present invention has the above configuration, a battery module that can position batteries with a simple configuration can be provided.

DESCRIPTION OF EMBODIMENTS

First Embodiment

Figure 1:
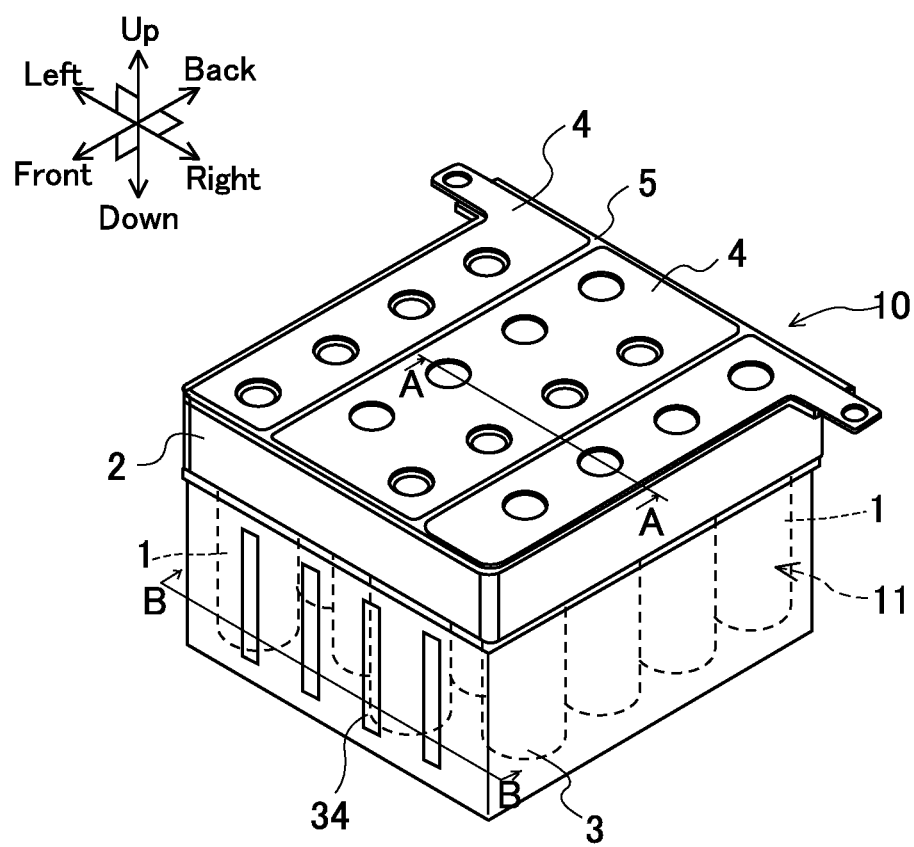
FIG. 1 is a perspective diagram of a battery module of a first embodiment.
Figure 2:
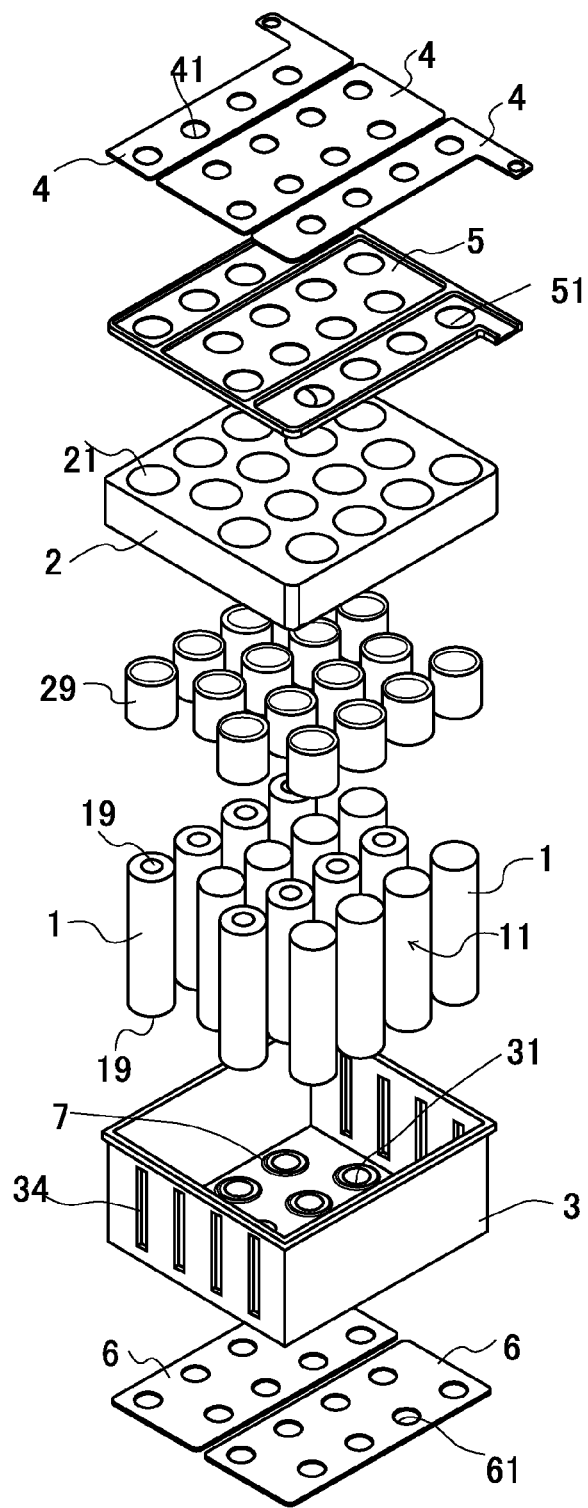
FIG. 2 is a disassembled perspective diagram of the battery module of the first embodiment.

A battery module according to an embodiment of the present invention will be described with reference to the drawings. As shown in FIG. 1 and FIG. 2, a battery module 10 is configured of a battery group 11, a holder 2, a casing 3, an upper bus bar 4, a separator 5, and lower bus bars 6.

As shown in FIG. 1 and FIG. 2, the battery group 11 is configured by a plurality of batteries 1. The plurality of batteries 1 is arranged in parallel to each other with their longitudinal directions being aligned. In the present embodiment, the battery group 11 is configured of 16 pieces of batteries 1. The respective batteries 1 in the battery group 11 are cylindrical cells having substantially the same shape with a diameter of 18 mm and a length of 65 mm, and each have a terminal 18 (positive terminal 18 and negative terminal 18) at both ends 19 in an axial direction.

Figure 3:
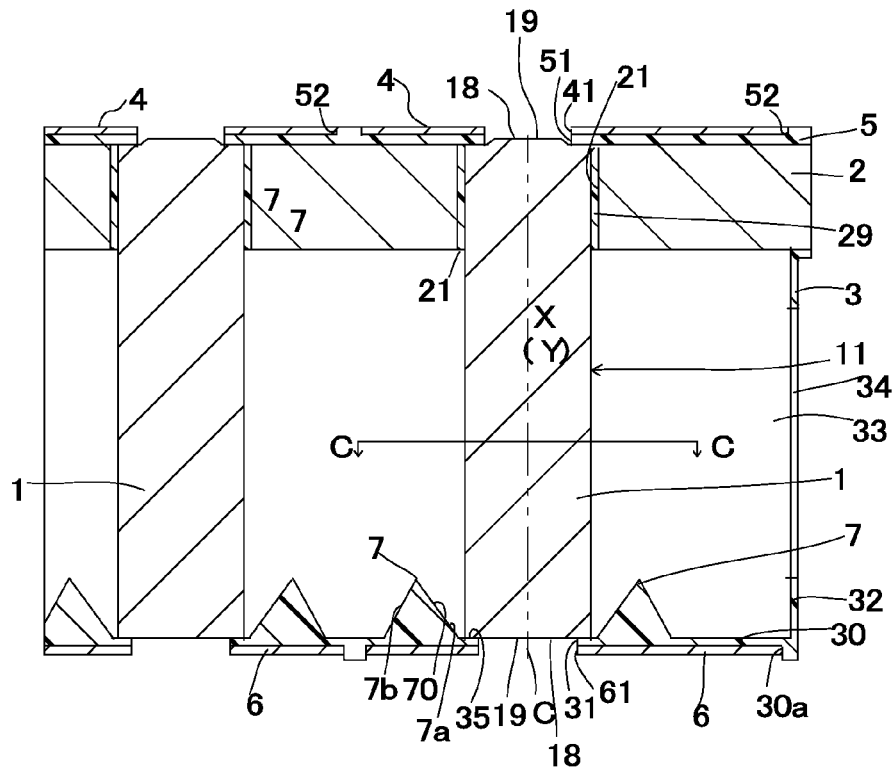
FIG. 3 is a cross sectional diagram along an arrow A-A in FIG. 1.
Figure 4:
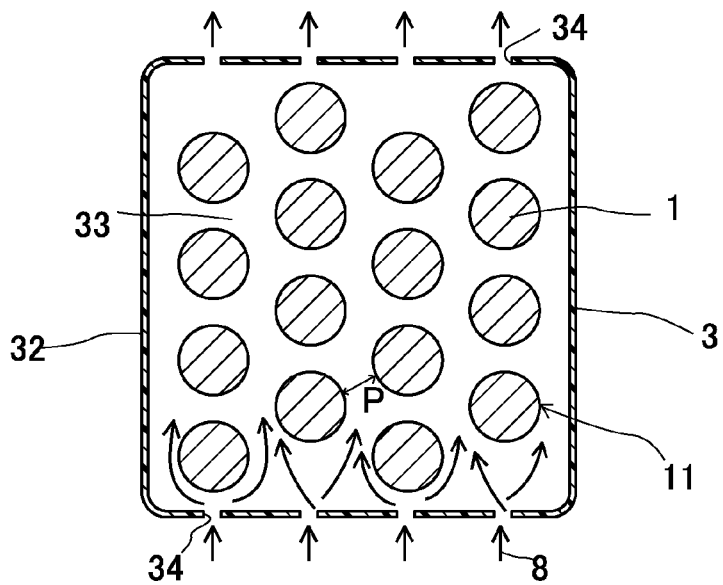
FIG. 4 is a cross sectional diagram along an arrow B-B in FIG. 1.

As shown in FIG. 3, the holder 2 is made of metal, and includes retaining holes 21 corresponding to the number of the batteries 1. The batteries 1 are inserted in the retaining holes 21. An interval having a width of 0.2 mm is formed between an inner circumferential surface of each retaining hole 21 and an outer circumferential surface of the corresponding battery 1. Adhesives 29 made of epoxy resin are interposed in the intervals, and fix the batteries 1 to the inner circumferential surfaces of the retaining holes 21. As shown in FIG. 4, the plurality of retaining holes 21 is arranged on the holder 2 so that a pitch P between the respective batteries 1 inserted in the retaining holes 21 becomes 2 mm.

As shown in FIG. 3, a casing 3 formed of resin is provided underneath the holder 2. The casing 3 includes a bottom wall 30, side walls 32, and a storing space 33 surrounded by the bottom wall 30 and the side walls 32. The casing 3 includes the storing space 33 whose opening is closed by the holder 2. The plurality of batteries 1 is housed in the storing space 33.

As shown in FIG. 4, a plurality of ventilation holes 34 extending in an up and down direction is formed on a pair of opposing side walls 32 of the casing 3. The batteries 1 housed in the storing space 33 are cooled by air 8 circulating in the storing space 33 through the ventilation holes 34.

As shown in FIG. 3, the bottom wall 30 of the casing 3 is an opposing wall portion facing the holder 2 with the storing space 33 in between. The bottom wall 30 includes hole portions 31, and projecting portions 7. The hole portions 31 are connection holes for electrically connecting the terminals 18 formed at the ends 19 of the batteries 1 with the lower bus bars 6 to be described later. The hole portions 31 have a circular shape. A diameter of the hole portions 31 is 12 mm, a diameter of the ends 19 of the batteries 1 is 18 mm; and a diameter of the hole portions 31 is smaller than the diameter of the ends 19 of the batteries 1. Peripheries of the hole portions 31 each have a receiving surface 35 where the end 19 of the battery 1 makes contact with the periphery of the hole portion 31 so as to retain the battery 1.

Figure 5:
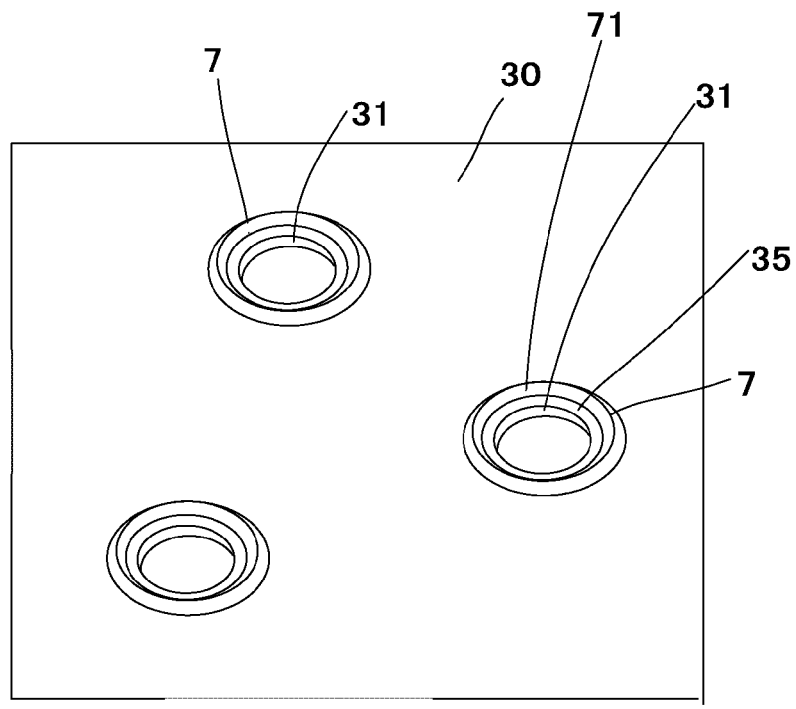
FIG. 5 is a partial perspective diagram of a bottom wall of a casing of the first embodiment.
Figure 6:
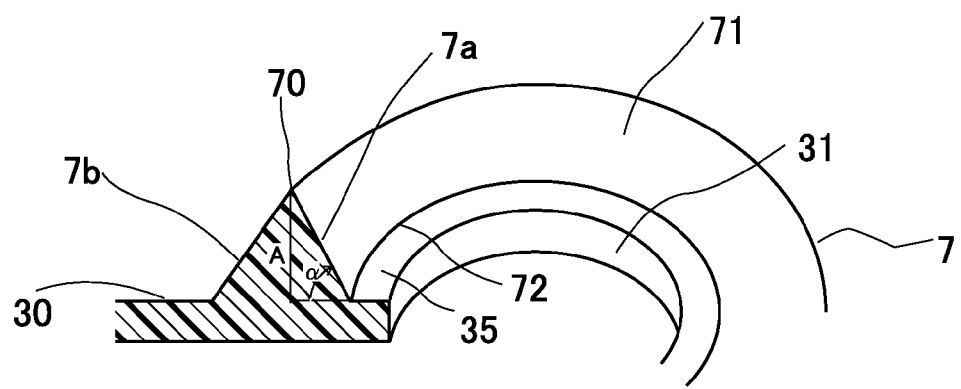
FIG. 6 is a cut-off perspective diagram of a projecting portion of the first embodiment.

As shown in FIG. 5, the projecting portions 7 are formed in a ring shape on an outer side than the receiving surfaces 35 on the peripheries of the hole portions 31. As shown in FIG. 6, the projecting portions 7 each include an inner surface 7a facing toward a hole portion 31 side, and an outer surface 7*b* facing toward an opposite side of the hole portion 31. The inner surfaces 7*a* of the projecting portions 7 each include a guiding portion 71. The guiding portions 71 are provided on the peripheries of the hole portions 31, and each guide the batteries 1 so that a central axis line X of each battery 1 passes through a center C of the hole portion 31 when the battery 1 is inserted in the retaining hole 21.

As shown in FIG. 6, when the projecting portion 7 is dissected by a cross section along a diameter direction of the hole portion 31, the guiding portion 71 may simply needs to be a portion formed on the projecting portion 7 as a tapered surface, and for example, it is exhibited as a straight line extending from a top portion 70 to a base portion 72 of the projecting portion 7. Further, the guiding portion 71 may be exhibited in the cross section of the projecting portion 7 where the guiding portion 71 is a curved line, or a line including both the straight line and the curved line. If the shape of the guiding portion 71 is to be exhibited as a curved line, the curved line may for example be a recessed curved line, or projecting curved line. Regardless of the shape of each of the guiding portions 71 of the projecting portions 7, an angle formed by the bottom wall 30 and a line drawn from the top portion 70 to the base portion 72, that is, an inclined angle α of the guiding portion 71 relative to the bottom wall 30 is preferably 5 to 80°, and more preferably 45 to 80°. This is for surely guiding the batteries 1 having been inserted into the storing space 33. In the present embodiment, the inclined angle α of the guiding portions 71 is 80°.

A preferred height A of the top portion 70 of each projection portion 7 corresponding to an outermost portion of the guiding portion 71 may change according to a size of the batteries 1, a height of the storing space 33, a size of the retaining holes 21 and the like. However, in order to surely guide the batteries 1, the height A of the ridge portions 70 is preferably 3 mm or more. In the present embodiment, the height A of the ridge portions 70 of the projecting portions 7 is 5 mm.

Further, when the batteries 1 are inserted into the storing space 33 via the retaining holes 21 of the holder 2, the batteries 1 are allowed to fall freely from the retaining holes 21. It is preferable that a ratio of the height A of the ridge portions 70 of the protruding portions 7 is 3% or more, when a maximum falling length of the batteries 1 is set as 100%. Moreover, when a height that adds those of the holder 2 and the storing space 33 is set as 100%, the ratio of the height A of the ridge portions 70 of the projecting portions 7 is preferably 3% or more. The guiding portions 71 having the ridge portions 70 with the above height being the outermost portions surely guide the batteries 1 by the batteries 1 making contact therewith. In the present embodiment, the height A of the ridge portions 70 is 4.1%, when the height that adds those of the holder and the storing space 33 is set as 100%.

Figure 7:
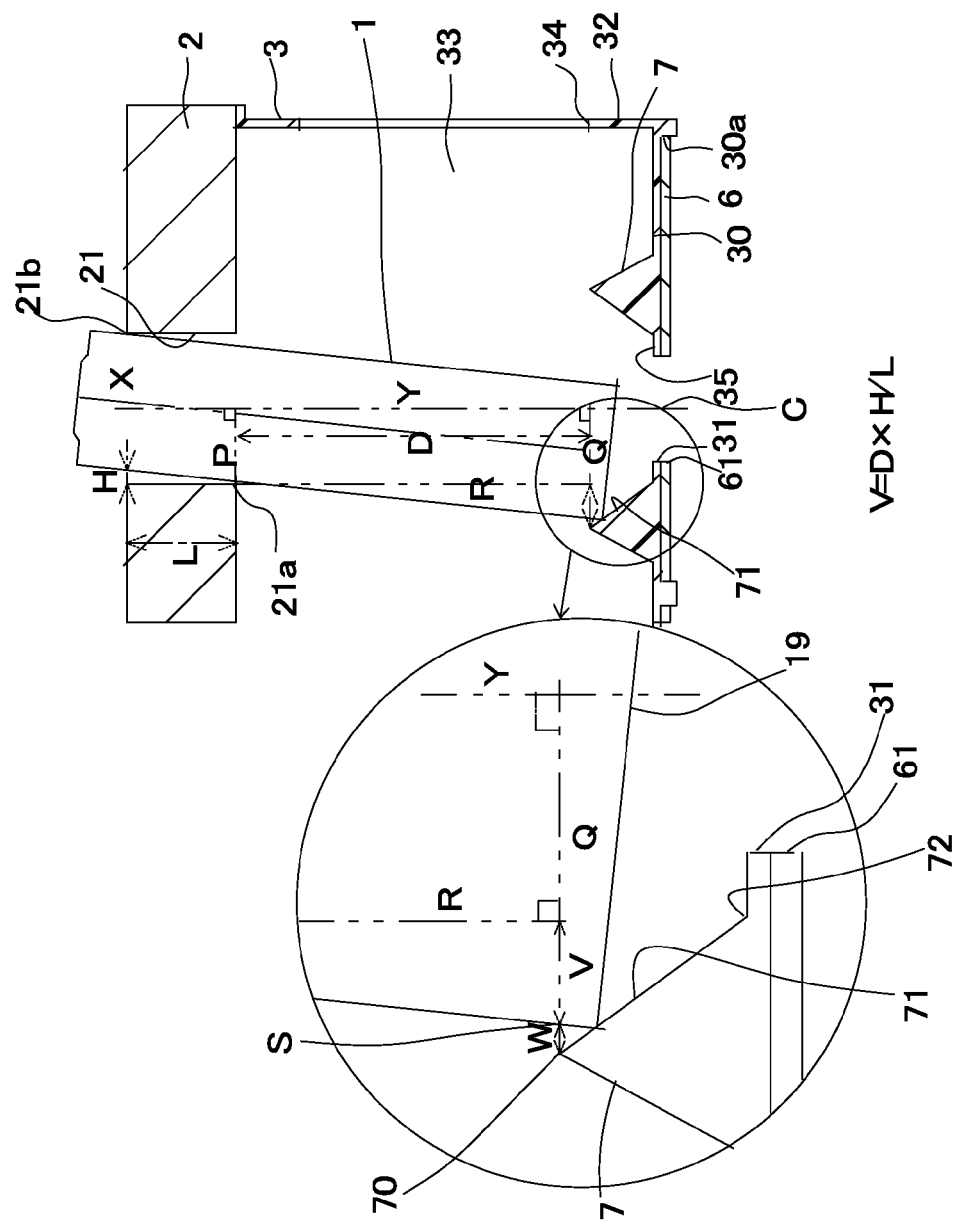
FIG. 7 is a cross sectional explanatory diagram of a battery, a holder, and a casing for indicating workings of a guiding portion when the battery is housed in the casing in the first embodiment.

Here, as shown in FIG. 7, each hole portion 31 is positioned directly below the corresponding retaining hole 21 of the holder 2, and a center C of the hole portion 31 is positioned on a central axis line Y of the retaining hole 21 of the holder 2. A width of an interval between the inner circumferential surface of the retaining hole 21 and the battery 1 when the battery 1 is most tilted in the retaining hole 21 relative to the central axis line Y of the retaining hole 21 is equal to a difference H of an opening diameter of the retaining hole 21 and a diameter of the battery 1. In the present embodiment, the difference H of the diameter of the retaining hole 21 and the diameter of the battery 1 is 0.4 mm. Further, a length L of the retaining hole 21 in an axial direction is 15 mm. A virtual perpendicular line drawn from an inner opening end 21*a* of the retaining hole 21 toward the central axis line Y of the retaining hole 21 is denoted as P. A virtual perpendicular line drawn from the outermost portion in the guiding portion 71, which is the portion farthest from the hole portion 31, that is, the top portion 70, toward the central axis line Y of the retaining hole 21 is denoted as Q. The virtual perpendicular lines P, Q respectively are straight lines drawn at a right angle relative to the central axis line Y. In this case, a distance D between the virtual perpendicular line P and the virtual perpendicular line Q is 45 mm. The top portion 70 of the projecting portion 7, that is, the outermost portion of the guiding portion 71 is positioned on an outer side of a position S, which is set apart toward an outer side in the diameter direction of the hole portion 31 by a distance V of D·H/L (1.2 mm) from a position on a straight line R extending in a direction of the central axis line Y of the retaining hole 21 and passing through the inner opening end 21*a* of the retaining hole 21. The top portion 70 preferably has a distance W from the position S that is exceeding 0 mm. With the guiding portion 71 being arranged at this position, the guiding portion 71 can be arranged on a traveling trajectory of the battery and can surely guide the battery 1, even if the battery 1 is inserted into the storing space 33 while being most tilted.

An innermost portion of the guiding portion 71 is the base portion 72 of the projecting portion 7 that is positioned on a boundary portion between the projecting portion 7 and the receiving surface 35. The base portion 72 of the projecting portion 7 may be at a same position as a straight line R that extends along a direction of the central axis line Y of the retaining hole 21 and passes through the inner opening end 21*a* of the retaining hole 21, and further, from an aspect of an accurate positioning, it is preferably positioned closer to the hole portion 31 than the straight line R. Moreover, the position of the base portion 72 should be set by taking account of variations in respective components and variations among the respective components, and the like.

Figure 8:
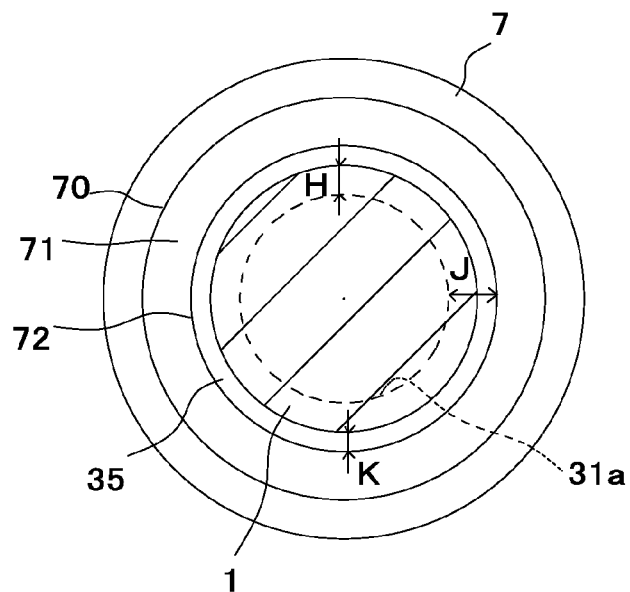
FIG. 8 is a cross sectional diagram along an arrow C-C in FIG. 3.

As shown in FIG. 8, the receiving surface 35 for retaining a battery 1 is formed between the base portion 72 of the projecting portion 7 and an opening peripheral portion 31*a* of the hole portion 31. A width J of each receiving surface 35 may be 0.1 to 5 mm. In the present embodiment, the width J of each receiving surface 35 is 1.5 mm. When the batteries 1 positioned by the guiding portions 71 are retained by the receiving surfaces 35, an overlapped width H of each end 19 of the battery 1 and the corresponding receiving surface 35 is preferably 1 mm or more, and in the present embodiment, the overlapped width H is 1 mm. Each receiving surface 35 has a width K that is wider by 0.5 mm than a contacting portion of the end 19 of the battery 1. In the present embodiment, the receiving surface 35 is a planar portion spreading in a direction forming a right angle with the central axis line X of the battery 1 arranged at a normal position. Note that the receiving surfaces 35 may somewhat be tilted toward an inserting direction X of the batteries.

As shown in FIG. 3, recesses 30*a* are formed on a lower surface side of the bottom wall 30 of the casing 3 and are provided with conductive lower bus bars 6 arranged therein. Conductive upper bus bars 4 are arranged on an upper surface side of the holder 2 via the separator 5 formed of insulating resin. The upper bus bars 4 are arranged in recesses 52 formed on the upper surface side of the separator 5. The lower bus bars 6, the separator 5, and the upper bus bars 4 respectively have openings 61, 51, 41 for exposing the terminals 18 formed at the ends 19 on axially both sides of the respective batteries 1. The terminals 18 formed at the axial ends 19 of the respective batteries 1 are electrically connected to the openings 61 of the lower bus bars 6 and the openings 41 of the upper bus bars 4 by a known method. In the present embodiment, a tab that is not shown protrudes from each of the openings 61 of the lower bus bars 6 and the openings 41 of the upper bus bars 4, and the terminals 18 of the batteries 1 are electrically connected to the tabs by welding and the like. Note that other than the above tabs, examples of a structure for electrically connecting the openings 61 of the lower bus bars 6 and the terminals 18 of the batteries 1 and electrically connecting the openings 41 of the upper bus bars 4 and the terminals 18 of the batteries 1 include wire bonding, soldering, and the like.

As shown in FIG. 1, a battery group 11 forms one set of battery pack by four batteries 1 arranged in a front and back direction, and serially connects the battery packs adjacent one another in a left and right direction by the upper bus bars 4 and the lower bus bars 6.

A method for manufacturing the battery module of the present embodiment will be described. The holder 2 is arranged on the casing 3. The holder 2 is positioned relative to the casing 3 such that the centers of the hole portions 31 of the bottom wall 30 of the casing 3 are positioned on the central axis line Y of the corresponding retaining hole 21 of the holder 2. The plurality of batteries 1 is inserted simultaneously into all of the retaining holes 21 of the holder 2. The plurality of batteries 1 is freely dropped once and then housed in the storing space 33 of the casing 3.

At this time, if the batteries 1 are inserted while being tilted into the storing space 33 of the casing 3, the ends 19 of the batteries 1 in the inserting direction abut the guiding portions 71 of the projecting portions 7, and are guided by the guiding portions 71, so that the batteries 1 are positioned such that the central axis lines X of the batteries 1 overlap with the centers of the hole portions 31. The batteries 1 are positioned within the storing space 33 on the central axis lines Y of the retaining holes 21 positioned directly above the hole portions 31.

The guiding portions 71 are preferably arranged on a moving trajectory of the ends 19 of the batteries 1 inserted into the storing space. Especially, it is preferable that the guiding portions 71 are arranged on the moving trajectory of the ends 19 of the batteries even when the batteries 1 are inserted into the storing space 33 while being most tilted. In this case, the ends 19 of the batteries 1 inserted into the storing space 33 surely make contact with the guiding portions 71, and are guided by the guiding portions 71.

As shown in FIG. 7, for example, the batteries 1 are inserted into the storing space 33 while being most tilted when the batteries 1 are inserted into the storing space 33 of the casing 3. In this occasion, the batteries 1 are engaged by the outer opening ends 21b and the inner opening ends 21a of the retaining holes 21 on opposite sides of the retaining holes 21 in the radial direction. The batteries 1 are inserted into the storing space 33 in this state, and when the ends 19 of the batteries 1 in the inserting direction side have reached a height of the ridge portions 70, which are the outermost portions of the guiding portions 71, the ends 19 of the batteries 1 in the inserting direction side are at the positions S that are each apart from the position on the straight line R extending in the direction of the central axis line Y of the retaining holes 21 from the inner opening ends 21a of the retaining holes 21, by a distance V, which is D·H/L, on the radially outer side of the hole portions 31. With each top portion 70, which is the outermost portion of the guiding portion 71, being positioned on the outer side of this position S, since the guiding portion 71 is positioned on the moving trajectory of the end 19 of each of the batteries 1 when the batteries 1 are tilted upon insertion and are inserted into the storing space 33 in such a state, the end 19 of the battery 1 surely makes contact with the corresponding guiding portion 71, and is guided so that the central axis line of the battery 1 passes through the center C of the corresponding hole portion 31. As shown in FIG. 3, when the central axis line X of each battery 1 is positioned so as to pass through the center C of the hole portion 31, the central axis line X of the battery 1 comes to match the central axis line Y of the corresponding retaining hole 21 of the holder 2.

Accordingly, the batteries 1 are positioned such that the central axis lines X of the batteries 1 pass through the centers C of the hole portions 31. Then, the ends 19 of the batteries 1 in the inserting direction are retained by the receiving surfaces 35 on the peripheries of the hole portions 31.

Thereafter, the lower bus bars 6 are fixed on the lower surface of the bottom wall 30 of the casing 3 by fitting them with cog portions that are not shown and formed on the casing 3. Further, the separator 5 and the upper bus bars 4 are laminated on the upper surface of the holder 2, and are fixed to the holder 2 with using adhesives. The lower bus bars 6 and the lower terminals 18 of the batteries 1, as well as the upper bus bars 4 and the upper terminals 18 of the batteries 1 are electrically connected.

In the battery module of the present embodiment, when the batteries 1 are housed into the holder 2 and the casing 3, the batteries 1 are inserted into the retaining holes 21 of the holder 2 and the hole portions 31 of the casing 3. When the batteries 1 are being inserted into the retaining holes 21, the guiding portions 71 formed on the projecting portions 7 guide the batteries 1 toward the centers C of the hole portions 31 so that the central axis lines X of the batteries 1 pass through the centers C of the hole portions 31. Due to this, the batteries 1 are positioned correctly relative to the casing 3 such that the central axis lines X of the batteries 1 pass through the centers C of the hole portions 31. Accordingly, the positioning of the batteries 1 can be performed with a simple configuration.

When the batteries 1 are inserted into the storing space 33, the batteries 1 can be positioned at their accurate positions, since they are guided toward the centers of the hole portions 31 by the guiding portions 71 even if the batteries 1 are inserted into the storing space 33 while being tilted. Due to this, intervals between the batteries 1 can be retained constant, and the batteries can uniformly be cooled by allowing the air to flow uniformly in the intervals between the batteries 1.

Further, when the batteries 1 housed in the storing space 33 receive external force, the batteries 1 may tilt, but are returned to the correct positions by being guided by the guiding portions 71.

Second Embodiment

Figure 9:
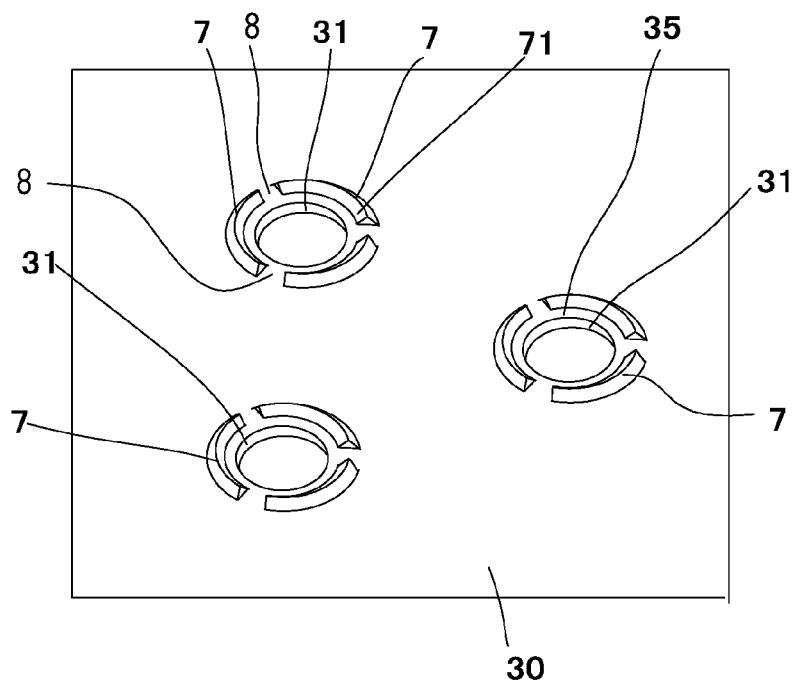
FIG. 9 is a partial perspective diagram of a bottom wall of a casing of a second embodiment.
Figure 10:
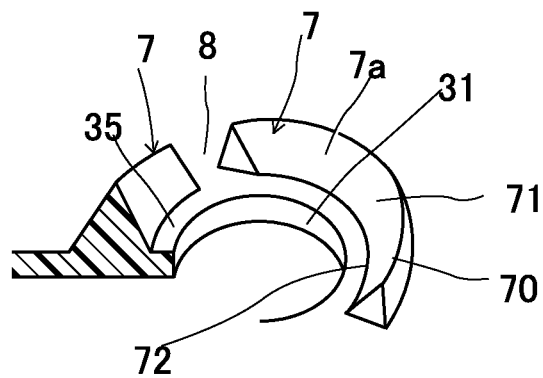
FIG. 10 is a cut-off perspective diagram of a projecting portion of the second embodiment.

The second embodiment having the projecting portions 7 to be formed on the bottom wall 30 of the casing 3, in that the projecting portions 7 are discontinuous in the circumferential direction of the hole portion 31, as shown in FIG. 9 and FIG. 10. The projecting portions 7 in the second embodiment differ from the projecting portions 7 to be continuing ring shape in the first embodiment 1.

The projecting portions 7 of the second embodiment are arranged in plurality in the circumferential direction of the hole portions 31 at the peripheries of the hole portions 31. Predetermined intervals 8 are formed between the respective projecting portions 7. The guiding portions 71 are formed on the inner surfaces 7a extending downward, while being tilted, from the ridge portions 70 of the projecting portions 7 toward the hole portions 31 and reaching the base portions 72. Peripheries of the hole portions 31 each have a receiving surface 35 that retains an end 19 of its corresponding battery 1.

Also in the projecting portions 7 of the second embodiment, it is provided with the guiding portions 71 for guiding the batteries 1 so as to allow the central axis lines of the batteries 1 to come closer to the straight lines passing through the centers of the hole portions 31, similar to the projecting portions 7 of the first embodiment. Due to this, the positioning of the batteries 1 can be performed with a simple configuration.

Third Embodiment

Figure 11:
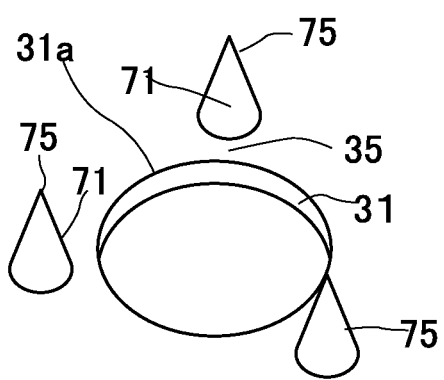
FIG. 11 is a partial perspective diagram of a bottom wall of a casing of a third embodiment.

The third embodiment having the protruding portions 75 to be formed on the bottom wall 30 of the casing 3, in that the protruding portions 75 are arranged in plurality along the circumferential direction on the peripheries of the hole portions 31, as shown in FIG. 11. The protruding portions 75 in the third embodiment differ from the projecting portions 7 having the ring shape in the first embodiment.

A side surface of each of the protruding portions 75 on a hole portion 31 side is the guiding portion 71. The guiding portion 71 is a tapered surface inclined radially inward toward the inserting direction of the batteries.

The protruding portions 75 may be of various shapes: for example, a cone such as a circular cone, a triangular cone, or a square cone; a polygonal truncated cone such as a circular truncated cone, a square truncated cone, and a pentagonal truncated cone; or protrusions with curved surfaces such as semi-spherical surfaces or elliptic semi-spherical surfaces. The shape of the protruding portions 75 in the third embodiment is conical.

The conical protruding portions 75 are arranged in plurality at regular intervals in the circumferential direction on the periphery of each hole portion 31. A number of the protruding portions 75 may be one, preferably two, and more preferably three or more. Among them, the ends 19 of the batteries 1 can be guided toward the center of the hole portions 31 from three directions because three protruding portions 75 are arranged on the periphery of each hole portion 31. Due to this, no matter in which direction the batteries 1 are tilted when they are inserted into the storing space 33, the ends 19 of the batteries 1 make contact with one of the three protruding portions 75, and the ends 19 of the batteries 1 are guided toward the centers of the hole portions 31. Accordingly, the positioning of the batteries 1 can be performed also with respect to the projecting portions 7 of the third embodiment also.

Each of the protruding portions 75 is formed at a position that is apart from the opening end of the corresponding hole portion 31 by the same distance. The receiving surface 35 for retaining an end of a battery 1 is formed between the inner opening end 31a of the hole portion 31 and each protruding portion 75. The positioned batteries 1 are stably retained by the receiving surfaces 35.

Fourth Embodiment

Figure 12:
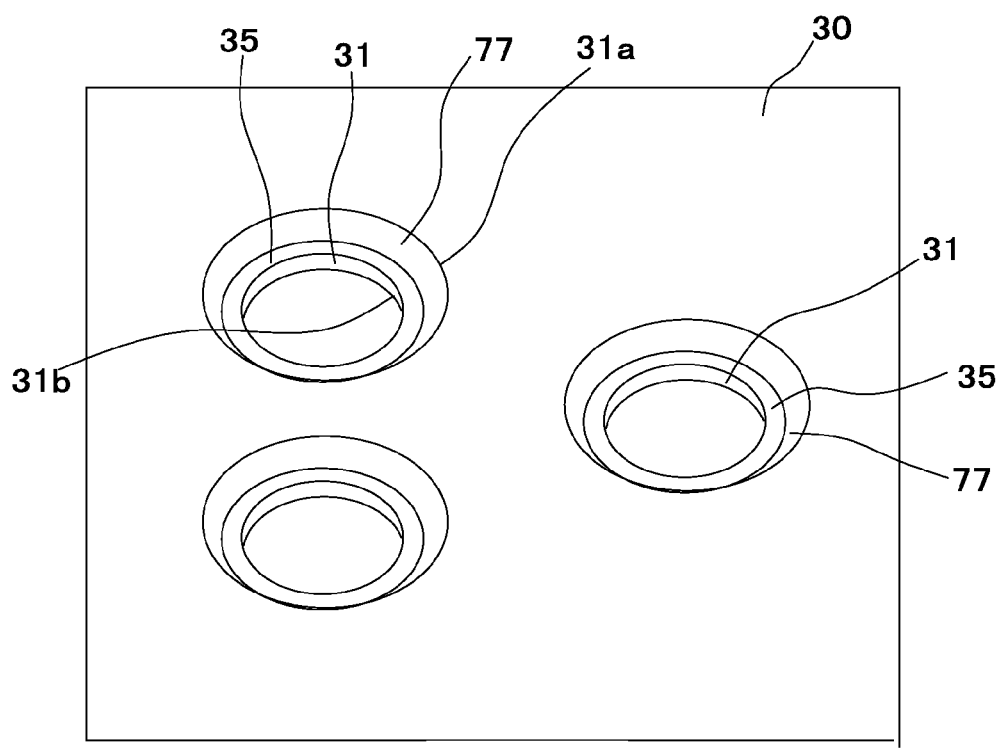
FIG. 12 is a partial perspective diagram of a bottom wall of a casing of a fourth embodiment.
Figure 13:
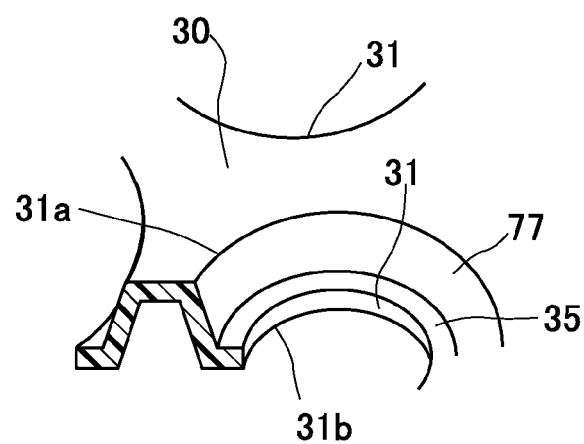
FIG. 13 is a cut-off perspective diagram of a projecting portion of the fourth embodiment.

The battery module of the fourth embodiment includes guiding portions 77 formed on the inner circumferential surfaces of the hole portions 31 as shown in FIG. 12. The guiding portions 77 are tapered surfaces that reduces the diameter toward a radially inner side from the inner opening ends 31a to the outer opening ends 31b of the hole portions 31. The receiving surfaces 35 that spread in parallel to the bottom wall 30 are formed on the inner side of the guiding portions 77. When the batteries 1 are inserted into the storing space 33 of the casing 3, the ends of the batteries in the inserting direction make contact with the guiding portions 77, are guided by the guiding portions 77, and are moved toward the centers of the hole portions 31. The ends 19 of the batteries are retained by the receiving surfaces 35 after having been guided toward the centers of the hole portions 31. Due to this, the batteries 1 are retained with the receiving surfaces 35 in a state where the centers of the hole portions 31 are located on the central axis lines thereof.

In the above embodiments, the ends 19 of the batteries 1 are retained with the receiving surfaces 35 formed on the hole portions 31. However, the receiving surfaces 35 may not be provided, and the ends 19 of the batteries 1 may penetrate the hole portions 31. In this case, the batteries 1 are retained by their side surfaces on the inner circumferential surfaces of the hole portions 31.

In the above embodiments, the inserting direction of the batteries 1 is a direction directed toward the bottom wall 30 of the casing 3 from the holder 2 side. Contrary to this, when the inserting direction of the batteries 1 is of a direction directed toward the holder 2 from the bottom wall 30 of the casing 3, an upper wall is provided on an upper portion of the casing 3, the hole portions 31 for inserting the batteries 1 are formed on this upper wall, and protrusions such as the projecting portions 7 or the protruding portions 75 may be formed on the peripheries of the hole portions 31 or the inner circumferential surfaces thereof.

The invention claimed is:

1. A battery module comprising:
   a battery group configured of a plurality of cylindrical batteries;
   a holder configured to retain the battery group so that the plurality of cylindrical batteries are bundled in parallel to each other, respectively; and
   a casing being closed by the holder and including a storing space for housing the battery group, wherein
   the casing includes an opposing wall portion facing the holder,
   the opposing wall portion includes hole portions that retain the plurality of cylindrical batteries by peripheries and/or inner circumferential surfaces of the hole portions, and guiding portions formed on the peripheries or the inner circumferential surfaces of the hole portions and configured to guide the plurality of cylindrical batteries during insertion into the storing space by causing the plurality of cylindrical batteries to come closer to centers of the hole portions, such that central axis lines of each of the plurality of cylindrical batteries pass through the centers of each of the hole portions, respectively,
   the holder includes a plurality of retaining holes that each include an inner circumferential surface along which each of the plurality of cylindrical batteries, respectively, is inserted and which retains a peripheral surface of each of the plurality of cylindrical batteries,
   the centers of the hole portions of the casing are positioned on central axis lines of the retaining holes, and
   in each of the guiding portions, an outermost portion of the guiding portion is positioned farther on an outer side than a position that is separated by a distance of D·H/L on a radially outer side of the corresponding hole portion from a position of a straight line extending in a central axis line direction of the retaining holes and passing through an inner opening end of the corresponding retaining hole, where a difference between an opening diameter of the retaining hole and a diameter of a battery of the plurality of cylindrical batteries is denoted H, a length of the retaining hole in the central axis line direction is denoted L, and a distance between a straight perpendicular-line extending from the inner opening end of the retaining hole to a central axis line of the retaining hole and a straight perpendicular-line extending from the outermost portion of the guiding portion, which is a portion that is farthest away from the hole portion, to the central axis line of the retaining hole is denoted D.

2. The battery module according to claim 1, wherein the guiding portions are tapered surfaces inclined radially inward toward an inserting direction of the plurality of cylindrical batteries.

3. The battery module according to claim 1, wherein the guiding portions are surfaces of protrusions that protrude toward the storing space from the peripheries of the hole portions on the opposing wall portion.

4. The battery module according to claim 1, further comprising
receiving surfaces for engaging ends of the plurality of batteries located farther on a radially inner side than the guiding portions, the receiving surfaces are provided on peripheries and/or inner circumferential surfaces of the hole portions.

5. The battery module according to claim 1, wherein a bottom of the storing space of the casing is configured of the opposing wall portion.

* * * * *